July 29, 1924.                                                           1,502,805
J. T. WISNER
DEVICE FOR FORMING HOLLOW ARTICLES OF PLASTIC MATERIAL
Filed May 8, 1923                    2 Sheets-Sheet 1
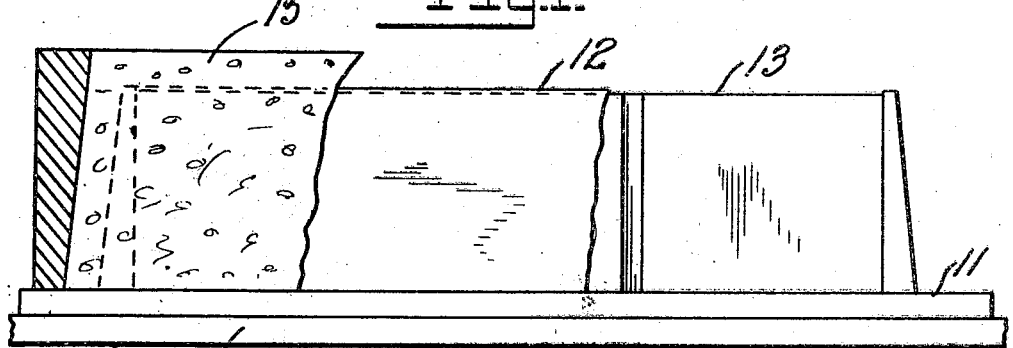
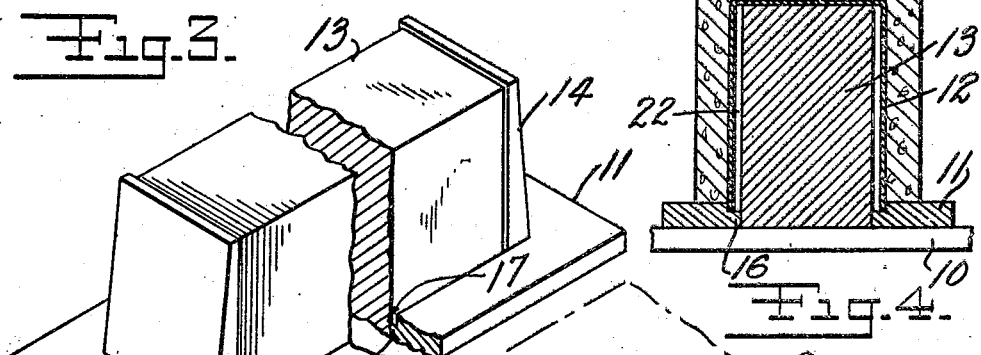
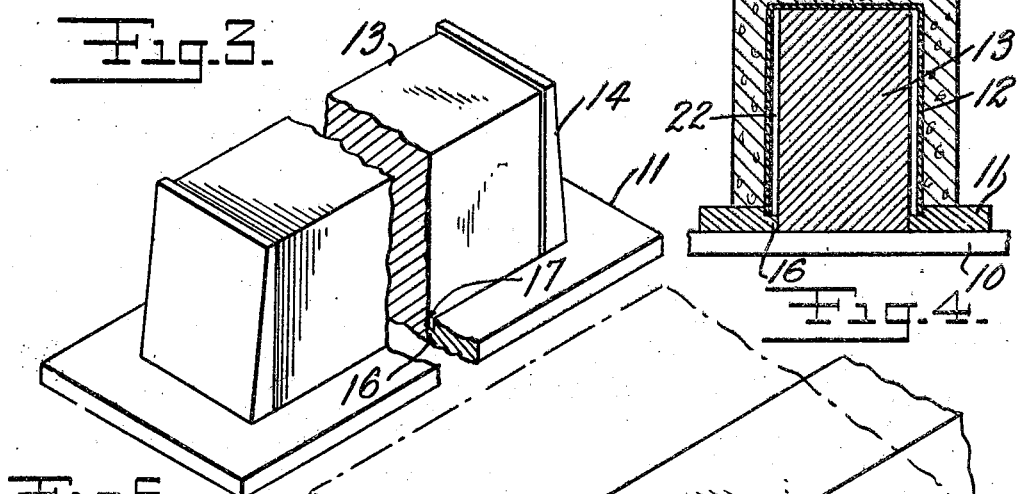
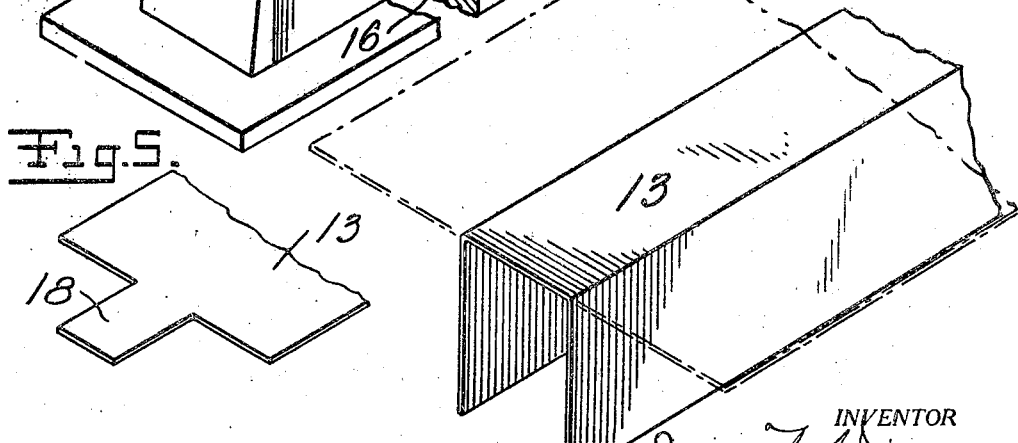
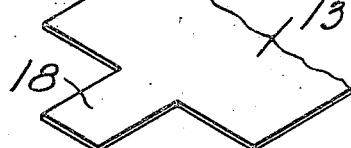
INVENTOR
James T. Wisner
BY
Frank ... ATTORNEYS July 29, 1924.
J. T. WISNER
1,502,805
DEVICE FOR FORMING HOLLOW ARTICLES OF PLASTIC MATERIAL
Filed May 8, 1923    2 Sheets-Sheet 2
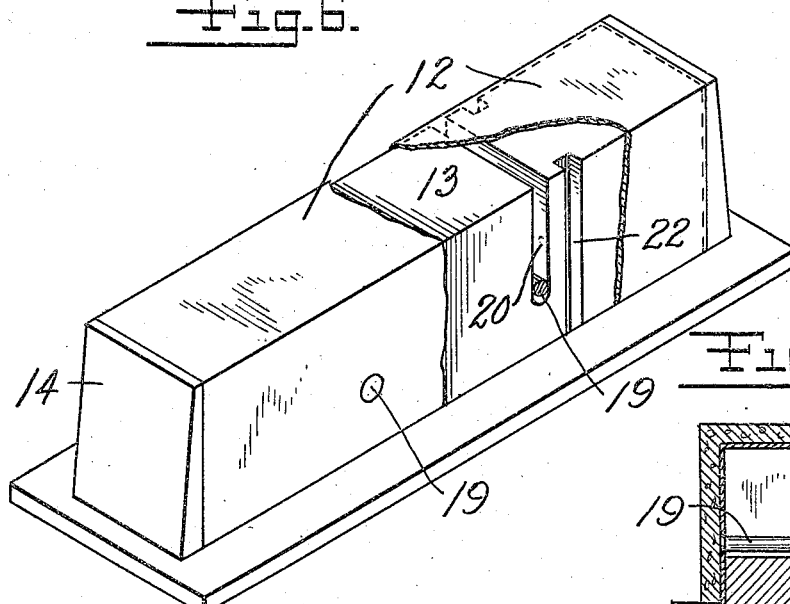
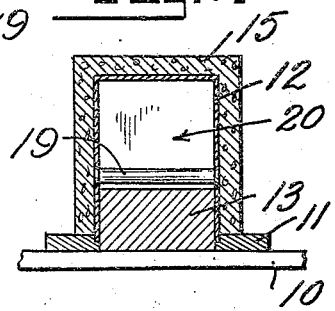
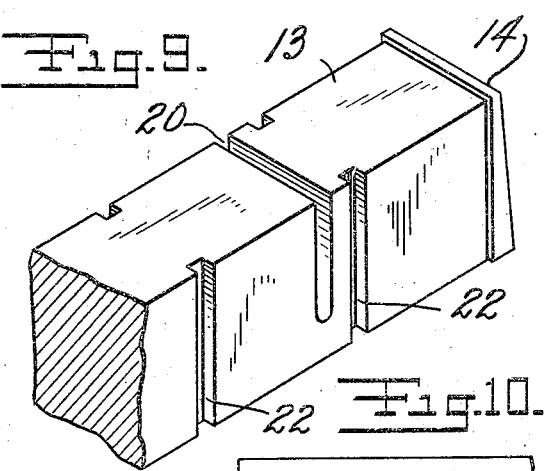
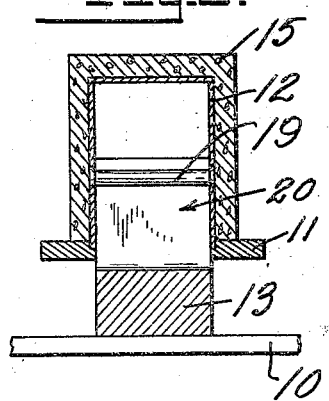
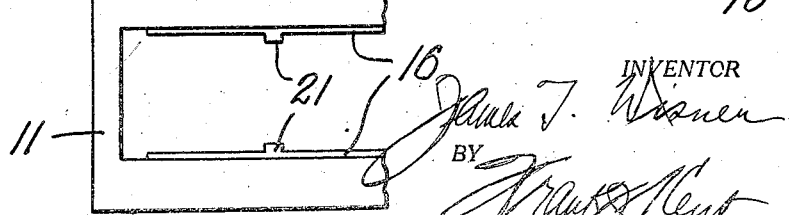

Patented July 29, 1924.

1,502,805

UNITED STATES PATENT OFFICE.

JAMES T. WISNER, OF NEW YORK, N. Y.

DEVICE FOR FORMING HOLLOW ARTICLES OF PLASTIC MATERIAL.

Application filed May 8, 1923. Serial No. 637,414.

*To all whom it may concern:*

Be it known that I, JAMES T. WISNER, a citizen of the United States, residing at New York, in the county of New York and State of New York, have invented certain new and useful Improvements in Devices for Forming Hollow Articles of Plastic Material, of which the following is a specification.

This invention relates generally to devices for forming hollow articles of plastic material.

In my Patent No. 1,267,488, May 28, 1918, I have described and claimed apparatus for manufacturing hollow ware of the type referred to by which I was enabled to produce the articles in only a fraction of the time theretofore found necessary for the purpose. This advantageous result was achieved by making use of a thin metal shell following the contour of a supporting filler block and serving as an inside mold for the article being formed. The use of the shell made it possible to remove the filler block immediately following the forming operation and before the material had hardened or set, thereby releasing the molds for immediate and repeated use.

The present invention is an improvement on the invention referred to and includes the use of a collapsible mold shell and a co-operating stripping plate which cooperates with the shell to hold the same in distended position when in place in the molded article. Other features of the invention will be hereinafter referred to.

In the drawings,

Figure 1 is a view in side elevation and partly broken away of a forming device embodying the invention.

Figure 2 is a view in cross section of the parts shown in Figure 1.

Figure 3 is a view in perspective and partly broken away of the parts shown in Figures 1 and 2.

Figure 4 is a view of a shell member forming part of the invention and showing how it is produced.

Figure 5 is a detail view showing a blank for a modified form of shell.

Figure 6 is a view similar to Figure 3 of a modified form of the invention.

Figures 7 and 8 are cross sectional views of the parts shown in Figure 6.

Figure 9 is a view in perspective of a filler block shown in Figure 6.

Figure 10 is a view of a portion of a stripping frame forming part of the invention.

Referring to the drawing for a more detailed description of the invention, in Figure 1 there is shown a supporting slab or platform 10 on which may be mounted a pallet or stripping plate 11 which supports in turn a sheet metal shell 12 which has the same conformation as a filler block 13 which rests directly upon the platform 10. The stripping plate 11 is provided near the ends thereof with end forming blocks 14 which have a converging formation toward their upper ends to produce a correspondingly slanting formation of the inner end walls of the mass of concrete 15 which is used to form the desired hollow article. An outside mold member of any desired or usual form may be used to mold the outer surface of the plastic mass 15 and as this particular portion of the apparatus forms no part of the present invention it is not shown in the drawing.

In Figure 3 of the drawing the stripping plate 11 is shown in its assembled relation to the filler block 13 and with a space provided into which the shell 12 may be received to form lateral walls flush with the side walls of the end mold members 14. The stripping plate 11 is provided on its inner edge with a flange or extension 16 which forms a groove or channel 17 into which the edges of the sheet metal shell 12 may be received in the manner indicated in Figure 2 of the drawing.

With the construction disclosed, the stripping plate 11, the shell 12 and the filler block 13 are assembled in the relation shown in Figure 2 of the drawing and with the mass of concrete 15 tamped into close engagement with the outer surface of the shell 12, it will be seen that the shell 12 is supported throughout its interior surface by contact with the outer surface of the filler block 13 so that the thin metal shell is not bulged or deflected in the tamping operation which is used in filling the concrete mass into position.

When the filling and tamping operation has been complete the outer mold may be immediately removed from its position and this may be followed by the removal of the platform 10 together with the filler block 12 supported thereon. This separation of the filler block from the shell 12 may be effected either by lifting the stripping plate 11 together with the concrete mass and the shell supported thereby, or by supporting the stripping plate in a stationary position and moving inwardly the platform 10 and the filler block supported thereby as will be obvious. After the removal of the filler block bulging or other deforming movements of the thin shell 12 are prevented by the engagement of the edges of the shell 12 with the grooves 17 previously referred to. It will be seen that the shoulder provided by the grooves prevents outward movement of the edges of the shell and thereby obviates any tendency which might otherwise exist to deform or crack the plastic mass 15.

The shell 12 is allowed to remain in position until the plastic mass has hardened or set and it will be seen that the extension of the edges of the shell below the upper surface of the stripping plate 11 causes a projection of the edges of the shell beyond the adjacent edges of the finished hollow article which permits of the seizing of the shell in order to withdraw it from its place in the hollow article. This facility of removal does away with the possibility of injuring the plastic mass in prying or hammering operations which might otherwise be employed to bring about the disengagement of the shell from its seat.

The removal of the shell is further facilitated either by omitting the use of end pieces in the shell, which are replaced by the end mold pieces 14 already referred to, or by making use of end pieces 18 such as are shown in Figure 5 of the drawing, which can be bent loosely to place without attachment to the adjacent end edges of the side wall members of the shell. By this construction the side wall members of the shell are permitted to be bent inwardly away from the engaged inner surfaces of the plastic mass to increase the ease of the removal of the shell from the article.

In Figures 6 to 9 of the drawing means are shown for further reinforcing the walls of the shell to prevent collapse or spreading thereof following the removal of the filler block. This means preferably consists of rigid strut members 19 connected at their ends directly to the side walls of the shell as is indicated in Figure 7 of the drawing. In order to permit relative movement of the filler block and shell when the strut members 19 are used vertical grooves or slots 20 are formed in the filler block in which the struts 19 are received in the interengagement of the block and shell. This relation of parts is clearly shown in Figures 6, 7 and 8 of the drawing. Preferably the ledge or flange 16 which is formed on the inner edge of the filling plate 11 is provided with guiding lugs or extensions 21 which are arranged to register with corresponding vertical grooves 22 formed in the side walls of the filler block. This structural arrangement provides for a perpendicular movement of the shell and block with relation to each other during their separation to insure that no twisting action will be produced that would tend to disrupt or deform the plastic mass supported by the shell and stripping plate.

It will be seen that the cooperation or relation between the stripping plate and the shell holds the shell in rigid position after the removal of the filler block thereby insuring the safety of the plastic mass and preventing its deformation or breakage. The collapse or inward bending of the shell walls which is provided by the omission of end walls altogether or the use of end walls which are not attached to the side walls clearly facilitates the separation of the shell and plastic mass after the concrete has set, as will be clear. The use of the apparatus described greatly expedites the production of articles of this general nature in that it permits the immediate and repeated use of the inside mold blocks without waiting for the concrete to set or harden.

What I claim is:

1. In apparatus for forming hollow articles of plastic material, a filler block and a collapsible shell fitting the external surface of the block and adapted to form the inner surface of the article, a stripper plate interengaging with the edges of the shell to hold the shell in position in the molded article, and said stripper plate having a cut-away portion to provide for removal therethrough of the filler block without removal of the shell.

2. In apparatus for forming hollow articles of plastic material, a filler block and a collapsible shell fitting the external surface of the block and adapted to form the inner surface of the article, a stripper plate having a groove therein to receive and hold the edges of the shell to thereby hold the shell in position in the molded article and to provide an extension of the edge of the shell beyond the edge of the molded article when the stripper plate is removed, and said stripper plate having a cut-away portion to provide for removal of the filler block without removal of the shell.

3. In apparatus for forming hollow articles of plastic material, a filler block and a collapsible shell fitting the external surface of the block and adapted to form the inner surface of the article, a stripper plate provided with an opening to receive the filler block, the edges of the opening being provided with a channel to receive and hold the edges of the shell to thereby hold the shell in position in the molded article, inwardly projecting lugs on the edge of the opening and guiding grooves in the side walls of the filler block to receive the lugs.

4. In apparatus for forming hollow articles of plastic material, a filler block and a sheet metal shell fitting the external surface of the block and adapted to form the inner surface of the article, a stripper plate provided with a groove to receive and hold the edges of the shell to hold the shell in position in the molded article, said shell having transversely extending strut members attached at their ends to the opposite side walls of the shell, said filler block being provided with slots to receive said rods, and said stripper plate being provided with an opening to provide for removal therethrough of the filler block without removal of the shell.

5. In apparatus for forming elongated hollow articles open along one side, a filler block and a sheet metal shell bent to fit three lateral faces of the block and adapted to form the corresponding inner faces of the article, a stripper plate provided with an opening to receive the filler block and having channels along opposite margins of the opening to receive the edges of the shell and hold the shell in position in the molded article, and upstanding members on the stripper plate adapted to close the ends of the shell and to mold the inner end faces of the article to be produced.

In testimony whereof I affix my signature.

JAMES T. WISNER.